United States Patent [19]

Mosher

[11] 4,315,261
[45] Feb. 9, 1982

[54] RADAR SIGNAL DETECTOR

[75] Inventor: Richard K. Mosher, Sudbury, Mass.

[73] Assignee: Controlonics Corporation, Littleton, Mass.

[21] Appl. No.: 156,102

[22] Filed: Jun. 3, 1980

[51] Int. Cl.³ .......................... G01S 7/28; G01S 7/36
[52] U.S. Cl. .................................. 343/18 E; 375/92; 455/227
[58] Field of Search ............ 343/7 A, 18 E; 375/92, 375/93; 455/226–229

[56] References Cited

U.S. PATENT DOCUMENTS

| | | | |
|---|---|---|---|
| 3,094,663 | 6/1963 | Siegel | 343/18 E X |
| 3,257,659 | 6/1966 | Siegel | 343/18 E |
| 3,408,574 | 10/1968 | Schmidt et al. | 343/18 E X |
| 3,550,008 | 12/1970 | Bright | 343/18 E X |
| 4,181,910 | 1/1980 | Hitterdal | 343/18 E |
| 4,182,990 | 1/1980 | Coffin et al. | 343/18 E X |

Primary Examiner—T. H. Tubbesing
Attorney, Agent, or Firm—Weingarten, Schurgin & Gagnebin

[57] ABSTRACT

A sensitive radar signal detector is provided which is operative to reliably detect low level radar radiation characteristic of scattered radiation of very short duration and unknown frequency. Received radar signals which are mixed with a swept frequency signal are passed through to a narrow band FM descriminator, the output of which is amplified by a unidirectional amplifier. The output of the amplifier, present when a signal is received, is utilized to momentarily slow the frequency swept local oscillator resulting in a time expansion of the characteristic S-shaped descriminator output signal. This results in the generation of a negative-going error signal between the two time expanded halves of the S-shaped descriminator response. The error signal when amplified produces a significant voltage spike which ensures reliable detection, to permit the detection of a single radar pulse with a reduced false alarm rate.

9 Claims, 2 Drawing Figures

RADAR SIGNAL DETECTOR

FIELD OF INVENTION

This invention relates to detecting the presence of electro-magnetic radiation and more particularly to a highly sensitive low-cost, low-alarm rate system which detects the presence of either low level CW or pulsed signals.

BACKGROUND OF THE INVENTION

The goal of a police radar detector is the detection of a speed trap before the police radar can acquire the vehicle and measure its speed. This often requires detection of relatively weak radiation scattered by the surrounding terrain. It is therefore important that any radar detection system have both sensitivity at low-cost and a sufficiently low false alarm rate. In the past, low sensitivity diode detectors such as described in U.S. Pat. No. 3,094,663 issued to V. H. Siegel on June 18, 1963, have been used due to their simplicity and low-cost. These detectors were broad band in response frequency to be capable of detecting signals at any frequency in the authorized police radar bands.

While detection of police radar by this method has been popular, police departments are using radars with signals which are somewhat more difficult to detect than the original CW signals. In one system regularly utilized by the police, a single 50 millisecond signal pulse is emitted from the radar transmitter and all Doppler information required for making a speed determination of an oncoming vehicle is accomplished through detecting the reflected single pulse.

The utilization of diode detectors such as illustrated in the Siegel patent, and also in U.S. Pat. No. 3,550,008, issued to J. A. Bright, Dec. 22, 1970, do not inherently provide the requisite sensitivity to capture with any degree of reliability this single pulse until a vehicle is within speed detection range of the police radar. Moreover, because of the broad band aspect of such receivers, they responded to all the noise in the police bands, thereby greatly limiting sensitivity because of a low signal-to-noise ratio.

SUMMARY OF THE INVENTION

It is the purpose of the subject invention to provide an extremely sensitive system in which the presence of weak radar signals, such as scatter from single pulse police radars, is reliably detected.

The present invention provides sensitivity by a narrow band detection technique which is capable of a high signal-to-noise ratio. The output of the detector is frequency swept and coupled to a narrow band FM descriminator. When an incoming signal is initially detected, the sweep is slowed so that the descriminator produces an error signal which when amplified produces a highly recognizable signal to improve the accuracy of detection. While in the past it was necessary to wait for as many as 30 pulses in order to ascertain whether or not a true radar signal was received, the present detector will respond on the basis of only one 50 millisecond pulse.

In one embodiment, the subject radar signal detector includes a superheterodyne front end in which incoming X band and K band signals are mixed down to a single narrow frequency band and then heterodyned with a swept local oscillator signal. The resultant signal is coupled to a narrow band FM descriminator, which has a high noise rejection. The output of the descriminator is coupled to an amplifier, with the output of the amplifier mixed with a signal from a sawtooth generator, inverted and fed back to slow the sweep of the swept local oscillator, thereby to expand the time interval when the descriminator narrow frequency response sees the incoming signal. This results in a negative-going error signal from the descriminator, which when amplified produces a voltage spike at the output of the amplifier to identify the presence of X band or K band signals.

This large voltage spike provides the indication that a radar signal has been detected. A threshold detector is then employed to ignore noise, yet respond to this large voltage spike to cause an alarm to be sounded or to produce some other indication of the existence of the radar signal.

In a further embodiment, the system is configured so as to give a Geiger counter-type indication of the proximity of the radar, such that a quickening tempo results from higher signal strength and indicates closer proximity.

While the subject system is described in connection with X band and K band police radars, it will be appreciated that the subject technique applies to the detection of electromagnetic radiation regardless of RF frequency.

BRIEF DESCRIPTION OF THE DRAWINGS

Other objects, features, and advantages of the invention will be best understood from the following detailed description, taken in conjunction with the accompanying drawings in which.

DETAILED DESCRIPTION

Figure 1:
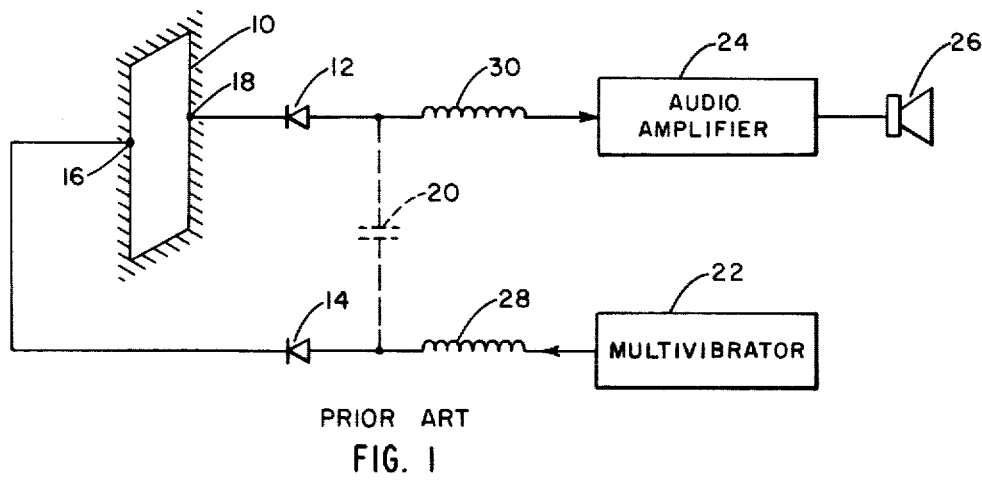
FIG. 1 is a block diagram illustrating a prior art CW microwave detection system.

As described above, prior art diode detectors are often times incapable of detecting the aforementioned low level single pulse typical of the current radar pulses from a police radar at remote points where it is desired to detect them. Referring now to FIG. 1, in the past, simple radar detectors of this type have utilized diode rectifiers 12 and 14, a multivibrator 22, an audio amplifier 24 and chock coils 28 and 30 to detect CW radar radiation. One such typical prior art diode detector includes a slot antenna 10, with the pair of crystal rectifiers 12 and 14 having like terminals, e.g., their cathodes, connected to opposite sides 16 and 18 of the slot antenna. The crystal rectifiers are adapted to operate respectively as a modulator or switch and as a detector and the physical disposition of these two rectifiers is such that a capacitance 20 is produced between the anodes of the rectifiers whereby the rectifiers, antenna, and capacitance form a closed loop input circuit adapted to transfer the multivibrator signal to a speaker 26 in response to reception of CW microwave energy.

One of the problems with the prior art system is that when utilizing diode detectors the system is broad band and subject to a very high false alarm rate due to pushing the sensitivity by increasing the gain of the system.

Not only is the false alarm rate inordinately high because of the lack of sensitivity of such a circuit but the system may not respond to a single pulse of microwave energy in the 50 millisecond region.

Figure 2:
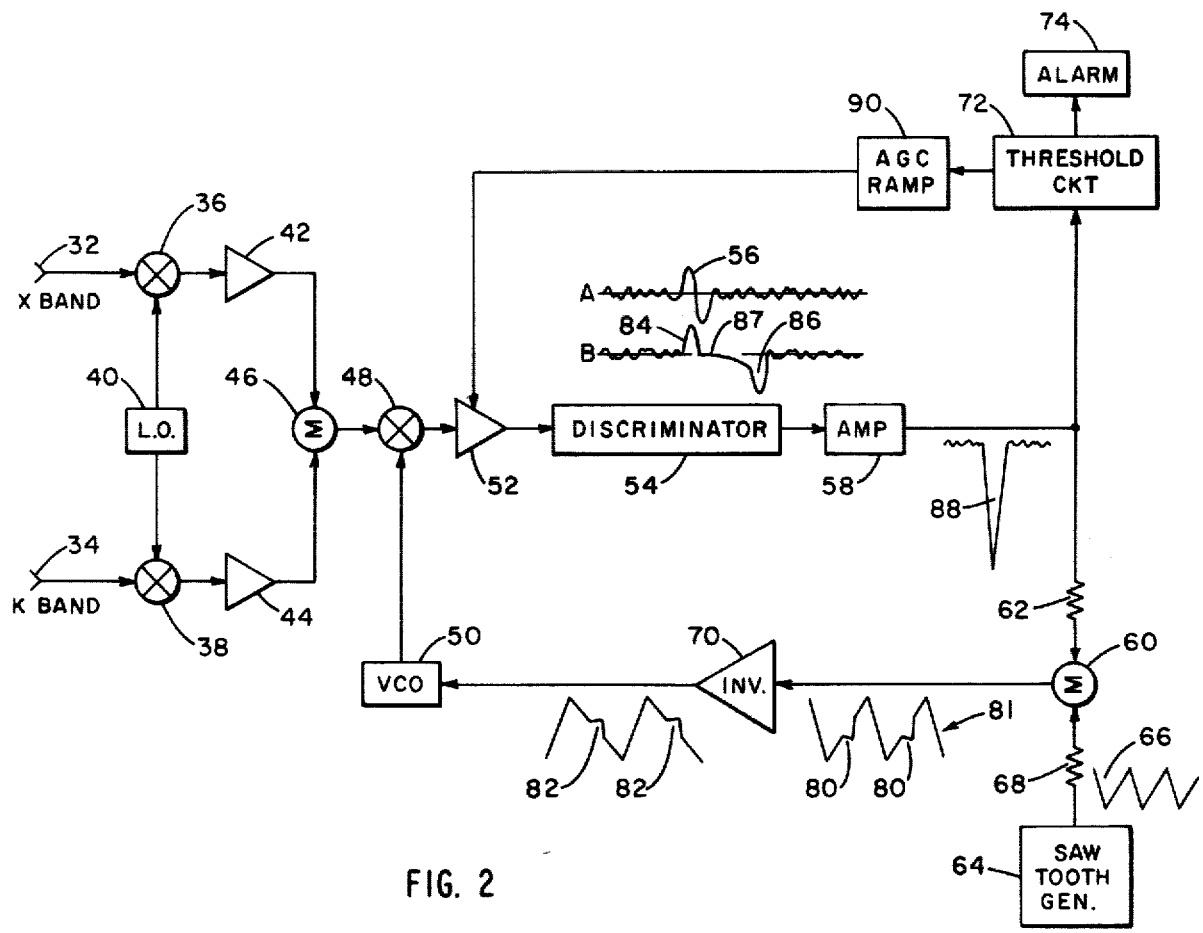
FIG. 2 is a schematic and block diagram illustrating one embodiment of the subject invention showing superheterodyne detection followed by a swept local oscillator mixing stage in which the local oscillator sweep is slowed responsive to an output from an FM descriminator.

In order to provide a system which will not only respond to CW, but also to a single pulse of scattered radar energy in the X or K band and referring now to FIG. 2, X band or K band energy received at antennas 32 or 34 respectively is coupled to mixing circuits 36 and 38 which mix the incoming X or K band signals with the fundamental and first harmonic output of a local oscillator 40.

In a preferred embodiment, with the X band covering 10.500–10.550 GHz, the local oscillator 40 is adjusted to a frequency of 11.533 GHz. The mix of the signal from local oscillator 40 with the X band signal from antenna 32 results in a difference frequency output signal at 1.008 GHz±0.025 GHz. The first harmonic of local oscillator 40 is at a frequency of 23.066 GHz which when mixed with the K band spectrum of 24.050–24.250 GHz, results in a difference frequency signal at 1.084 GHz±0.100 GHz. Thus incoming radar signals having two distinct frequency ranges are mixed down to a single signal having narrow frequency spread. The outputs of mixers 36 and 38 are, after amplification by amplifiers 42 and 44 respectively, combined by summer 46, the output of which is then applied to a further mixer 48 for mixing with a swept frequency signal from a voltage controlled oscillator 50. Oscillator 50 is swept in frequency, in one embodiment, at a repetition rate of 40 Hz repeatedly over a range from 0.983–1.183 GHz.

Thus far with a signal present at the output of summer 46, the output signal of mixer 48 will be a signal swept over a frequency range dependent upon the input frequency but passing through 45 MHz once or twice. This signal is applied through an amplifier 52 to a conventional narrow band FM descriminator 54 which may be of the type designated MC 1357, manufactured by Motorola, Inc.

In the preferred embodiment, the descriminator is set to respond to a frequency of 45 MHz. As illustrated by waveform A, when the swept signal from amplifier 52 passes through 45 MHz, an S-shaped signal curve 56 results as an output signal from descriminator 54. This signal is applied to an amplifier which amplifies the S-shaped curve. In one embodiment this amplifier is unidirectional in that it only amplifiers negative-going input signals.

The output of amplifier 58 is applied to a summer 60 through a resistor 62. A sawtooth generator 64 having a 40 Hz sawtooth ouput as illustrated at 66 is applied to summer 60 via a resistor 68. The output of summer 60 is applied to an inverter 70 and thence as the sweep control input of voltage controlled oscillator 50. Note that register 62 has a larger value than registor 68 to adjust the relative voltages from amplifier 58 and sawtooth generator 64 so as to achieve sweep slowing.

The output of amplifier filter 58 is also applied to a threshold circuit 72 and thence to an alarm indicator 74.

In operation, when a single pulse of X band or K band radiation is received at the unit, and assuming the pulse duration is as long as the sweep time to be sure 45 MHz is hit, the output of mixer 48 will sweep through 45 MHz at least once during the pulse due to the sweep of voltage controlled oscillator 50. This produces the S-shaped signal 56 at the output of descriminator 54. When the characteristic S-shaped signal appears at the output of the FM descriminator, the negative-going portion is amplified. This in turn causes a slowing of the sweep oscillator 50 which causes the S-shaped signal to be split apart with a slight negative droop in the descriminator output signal which constitutes a negative error signal. This negative error signal is amplified to provide the large negative-going spike. Thus the occurrence of an S-shaped descriminator output results in an initial negative-going output signal from the amplifier 58 which when summed with the output from sawtooth generator 64, provides for a reduction of the voltage change rate from the sawtooth generator 64 such as illustrated by the flattened portion 80 of the output signal 81 from summer 60. When inverted, portions 80 appear as portions 82 illustrated as the output of inverter 70 which momentarily cause the voltage controlled oscillator to slow its sweep. This produces an effect as illustrated by waveform B in which the S-shaped response characteristic for the descriminator is split apart or time expanded such that a positive going portion 84 is separated from a negative-going portion 86. Note when the sweep rate is slowed, the descriminator output is held just off zero. This produces a negative droop 87 in the output of the descriminator which forms the error signal that when amplified results in the production of a spike 88. When amplifier 58 saturates the system is reset.

This slowing of the sweep rate provides a noise-free negative-going error signal and produces a large negative spike 88 when amplified, which in turn provides a great increase in the system's sensitivity to incoming radar signals with the ability to reject noise or other spurious signals.

In one embodiment, a low pass filter characteristic may be present in amplifier 58, which low pass filter characteristic passes output spike 88 from amplifier 58 and rejects noise and frequencies above that represented by the spike.

The output of threshold circuit 72 may additionally be applied to an AGC ramp circuit 90, the output of which is utilized to control the gain of amplifier 52 by generating a declining ramp voltage once triggered by the presence of an output from circuit 72. Amplifier 52 may be a gain-controlled amplifier such as a model MC1350 manufactured by Motorola, Inc. At the appearance of an output signal from circuit 72, AGC ramp circuit 90 reduces the gain of amplifier 52 until the signal applied to circuit 72 falls below its threshold. At this point the gain of amplifier 52 is permitted to recover.

In the case of CW signals or pulsed signals with a high repetition rate, if a strong signal is received by the system, amplifier 52 operates with a short recovery time, such that the cycling of the system will be relatively rapid providing a Geiger counter effect. For each re-cycling an audible indication may be given by alarm 74. For weaker signals, the system will not recover as fast such that the audible indications will be further spaced apart in time. This provides an audible repetition rate that gives a measure of proximity to a police radar unit.

Having above indicated a preferred embodiment of the present invention, it will occur to those skilled in the art that modifications and alternatives can be practiced within the spirit of the invention. It is accordingly intended to define the scope of the invention only as indicated in the following claims.

I claim:

1. A radar signal detector comprising:

means for receiving an incoming radar signal at a frequency within a range of frequencies;

means for generating a frequency swept signal at a predetermined sweep rate;

means for multiplying the signal from the receiving means with said frequency swept signal to produce a difference signal;

narrow band descriminator means responsive to said difference signal and operative to provide FM demodulation thereof;

an amplifier coupled to the demodulated output of said descriminator means; and, means responsive to the output of said amplifier for reducing the sweep rate of said frequency swept signal generating means; and, means for providing an indication of a received signal in response to a predetermined output of said amplifier.

2. The detector of claim 1 wherein said receiving means includes means for receiving signals covering a number of frequency bands and for converting a received signal regardless of which band it occupies to a signal occupying a single predetermined band.

3. The detector of claim 2 wherein said frequency bands are the X and K bands and wherein said coverting means includes a single local oscillator and heterodying means utilizing the fundamental and a harmonic of said local oscillator.

4. The detector of claim 1 wherein said indication providing means includes means for generating audible indications of the proximity of the source of a received radar signal.

5. The detector of claim 4 wherein said audible indications generating means includes means for reducing the amplitude of said difference signal responsive to the amplitude of the output of said amplifier exceeding a predetermined level and for increasing the amplitude of said difference signal responsive to the amplitude of the output of said amplifier falling below said predetermined level.

6. The detector of claim 1 wherein said means for generating a frequency swept signal includes a voltage controlled oscillator, a sawtooth generator and means for coupling the output of said sawtooth generator to said voltage controlled oscillator for the control thereof.

7. The detector of claim 6 wherein said reducing means includes means for summing the output signal from said amplifier with the output from said sawtooth generator.

8. The detector of claim 7 wherein said reducing means further includes means for inverting the output of said summing means.

9. The detector of claim 1 wherein said amplifier has a low pass filter characteristic.

* * * * *